W. A. Lighthall,
Pipe Coupling.
No. 105,817. Patented July 26, 1870.
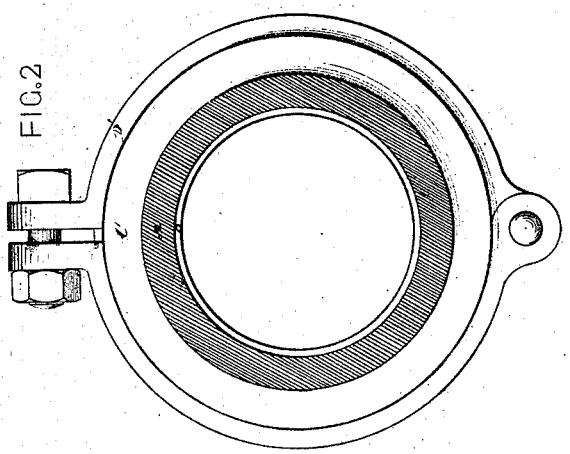
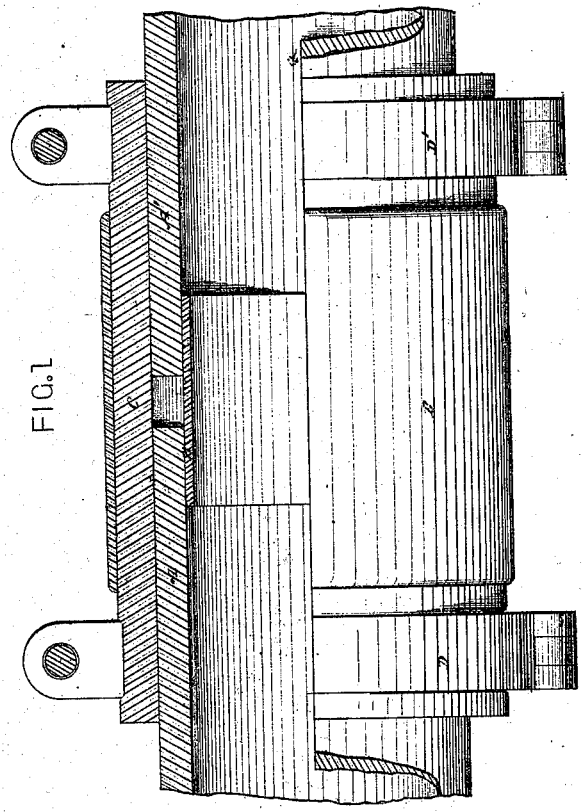

United States Patent Office.

WILLIAM A. LIGHTHALL, OF NEW YORK, N. Y.

Letters Patent No. 105,817, dated July 26, 1870.

IMPROVEMENT IN PIPE-COUPLINGS.

The Schedule referred to in these Letters Patent and making part of the same.

*To all whom it may concern:*

Be it known that I, WILLIAM A. LIGHTHALL, of the city, county, and State of New York, have invented a new and improved "Slip-Joint," for steam and exhaust-pipes for steam-engines and similar articles; and I do hereby declare that the following is a full and exact description of the same, reference being had to the accompanying drawing and to the letters of reference marked thereon, in which—

Figure 1 is a broken half section, and
Figure 2, a transverse section.

The object and purpose of my invention consists in making a "slip-joint" for steam and exhaust-pipes and other similar articles, which is made by providing an India-rubber sleeve, to cover and connect the pipes to which it may be attached, in such manner as to allow the said pipes to move by expansion and contraction, without disturbing the joint, or to produce a leakage in the same, when the same is combined with an interior metal sleeve, placed within the pipes at their connecting points, to prevent the pressure from within, in case of interior pressure, and the pressure from without, in case of exterior pressure, from affecting the outer India-rubber sleeve, as described; and also, by a further combination of the aforenamed elements with an outer metal sleeve, placed upon and put over the rubber sleeve, to effect the purposes hereinafter named.

A and A' are the two connecting-pipes, which are separated to a sufficient distance to allow for any expansion and contraction that may occur in their use.

B is an interior metal sleeve, which is made to fit the bore of the connecting-pipes, and of such length as to cover the spaces between the connecting-pipes at their maximum expansion.

It may be desirable to secure this interior sleeve, at one end, to the interior of the connecting-pipe, to prevent it moving from position, through the alternate expansions and contractions of the connecting-pipes, but yet this is not deemed a matter of necessity, but only of safety.

C is the rubber sleeve, which is slipped over the ends of the connecting-pipes, and secured in place by the bands D D'.

This sleeve is made of sufficient thickness to resist the pressure of steam from the interior of the pipes, when applied to steam-pipes, or to resist the pressure of the atmosphere, when used for vacuum-pipes.

E is an outer metal sleeve, placed over and upon the rubber sleeve C, between the bands D D', for the purpose of resisting the undue pressure outward of the rubber sleeve, when the pipes are connected and used as steam-pipes.

The natural elasticity of the rubber sleeve will allow it to expand and contract with the expansion and contraction of the pipes to which it is attached, and also to allow of any lateral motion in the pipes to which they may be subjected, making the same, in combination with the sleeves named, the cheapest and most perfect slip-joint, for the purposes described, that has yet been devised.

What I claim as my invention, and desire to secure by Letters Patent, is—

1. The combination of the pipes A A' with the rubber sleeve C and the metal sleeve B, as and for the purpose set forth.

2. The combination of the pipes A A' with the rubber sleeve C and the metal sleeve B, with the bands D D', as and for the purpose named.

3. The combination of the pipes A A' with the rubber sleeve C, the metal bands D D', and the metal sleeves B and E, as and for the purpose set forth.

WM. A. LIGHTHALL.

Witnesses:
FRANCIS S. LAW,
J. O. BAKER, Jr.